Feb. 23, 1971     C. VAN DER LELY     3,564,828
TRANSPORTABLE PRESSING MACHINE FOR COMPRESSING CROP
Filed Oct. 1, 1968     8 Sheets-Sheet 1
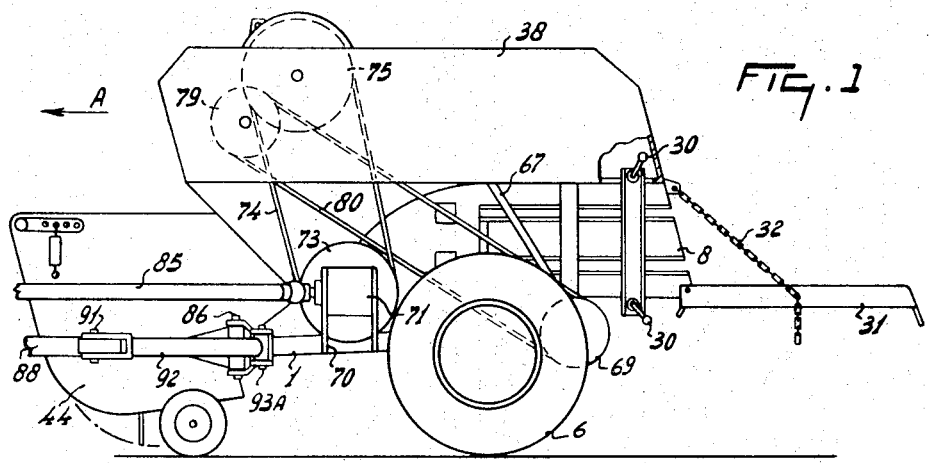
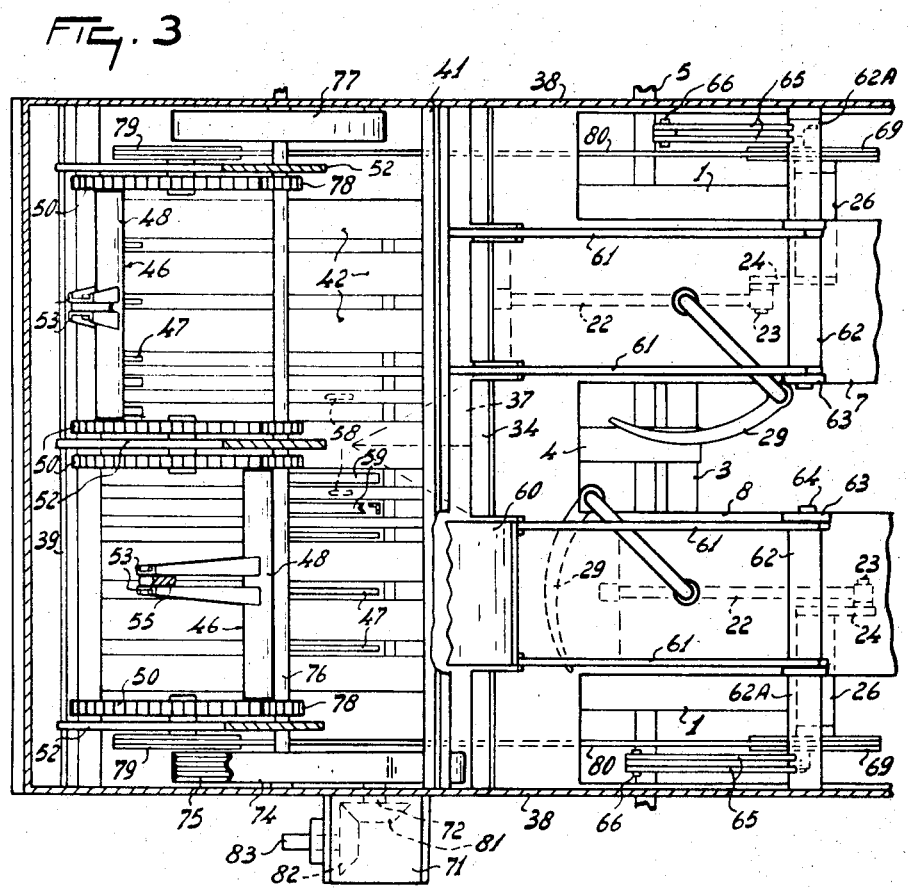
INVENTOR
CORNELIS VAN DER LELY
Mason, Mason & Albright
Attorneys

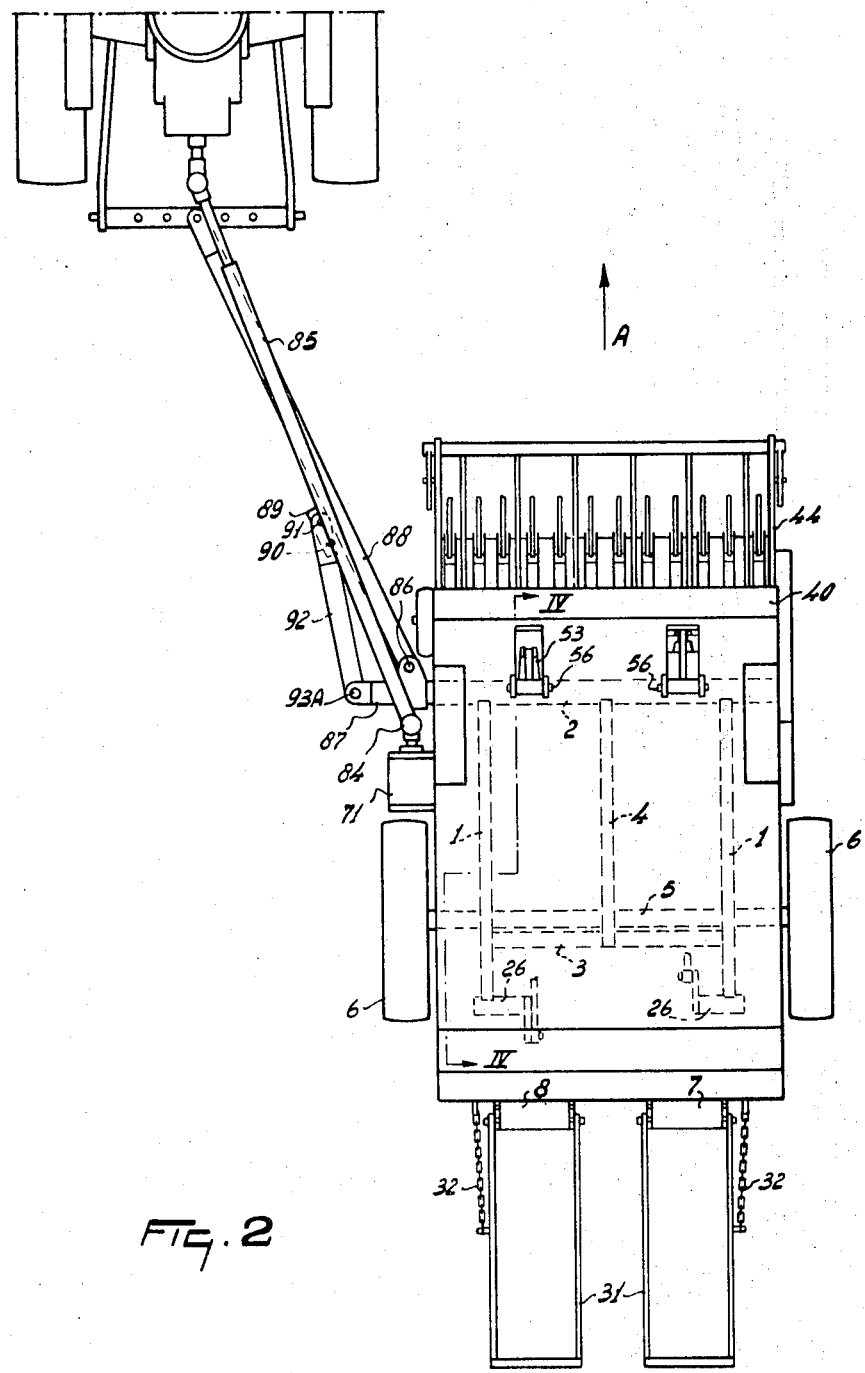

INVENTOR
CORNELIS VAN DER LELY

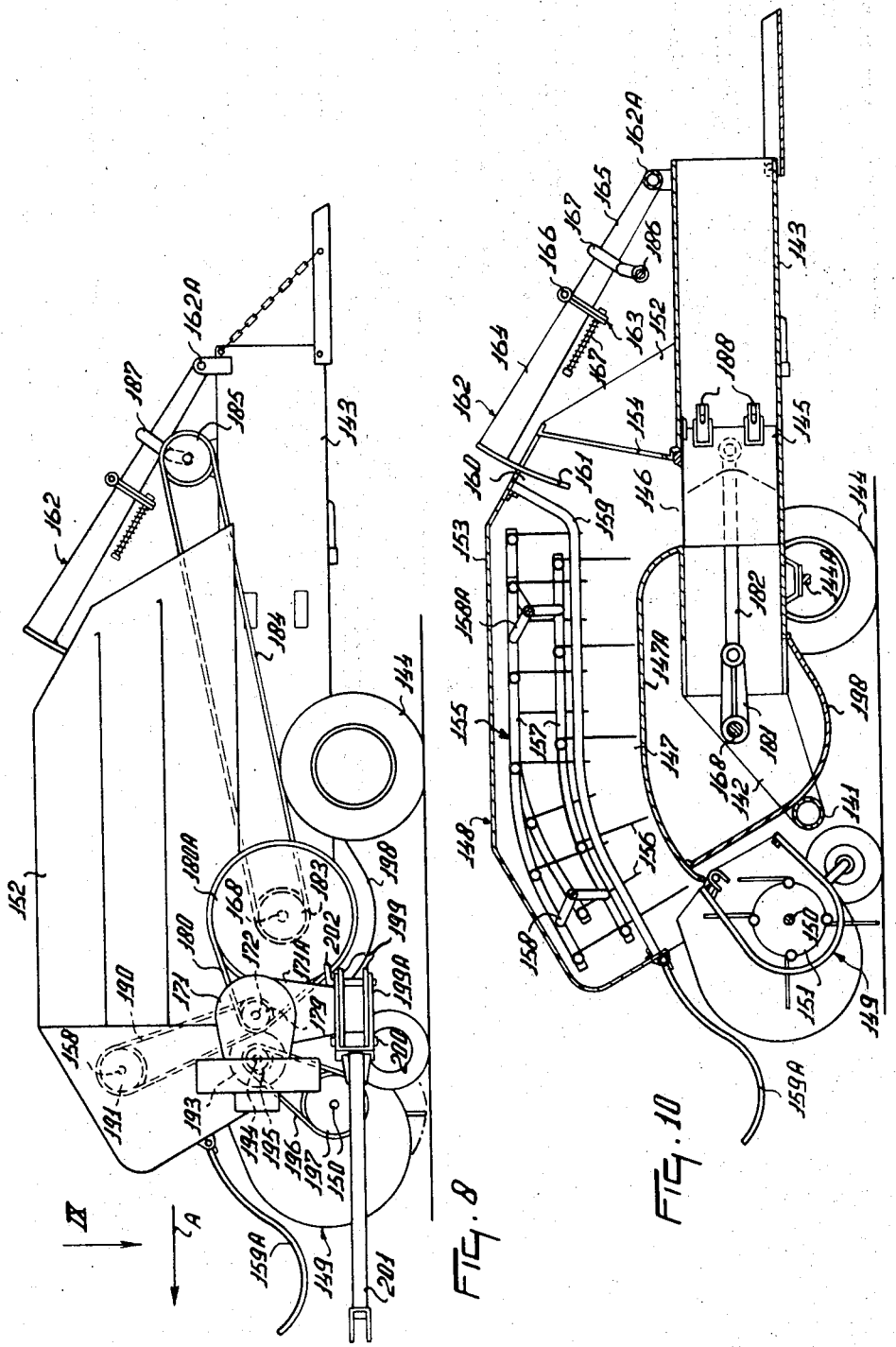

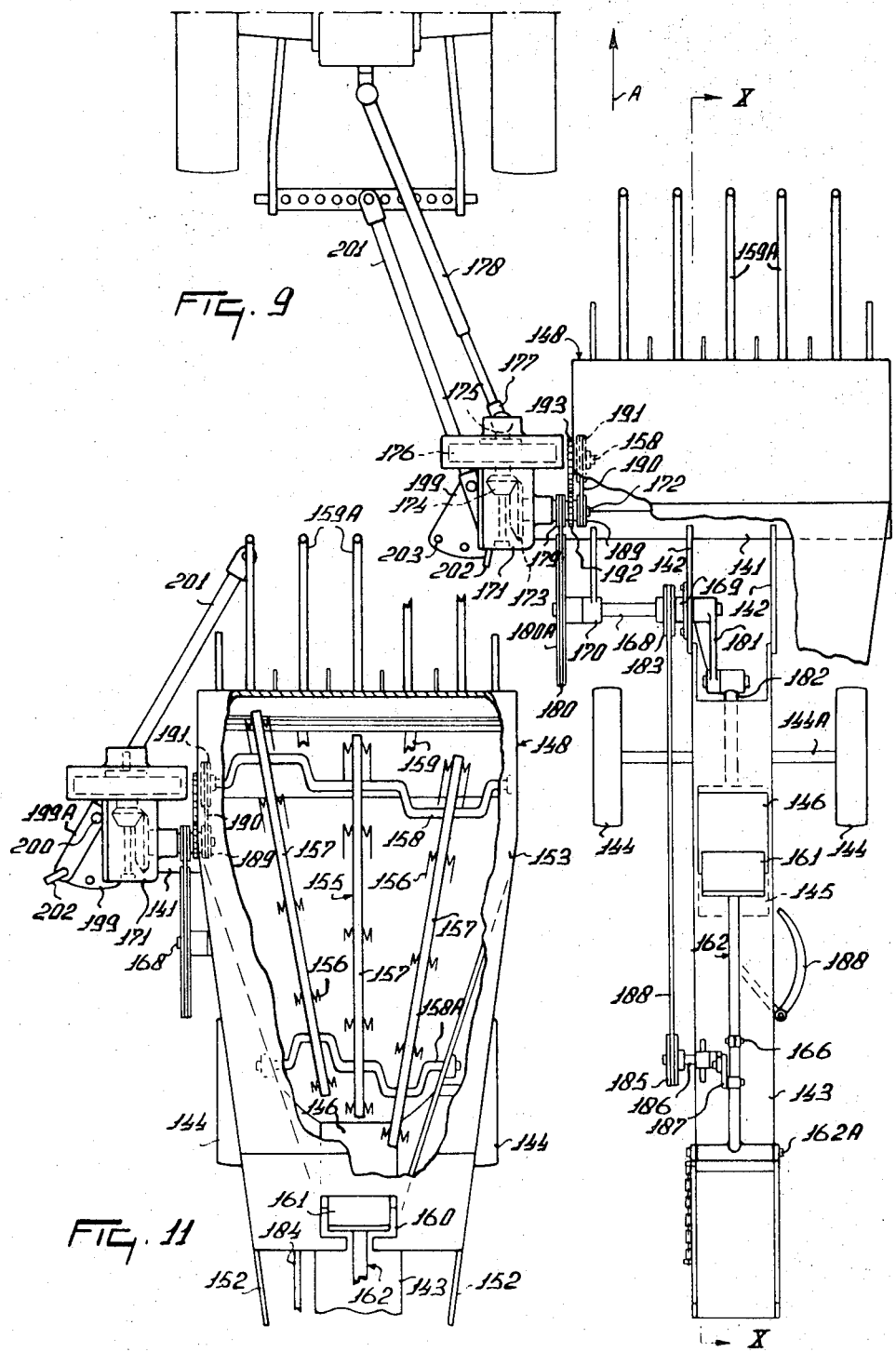

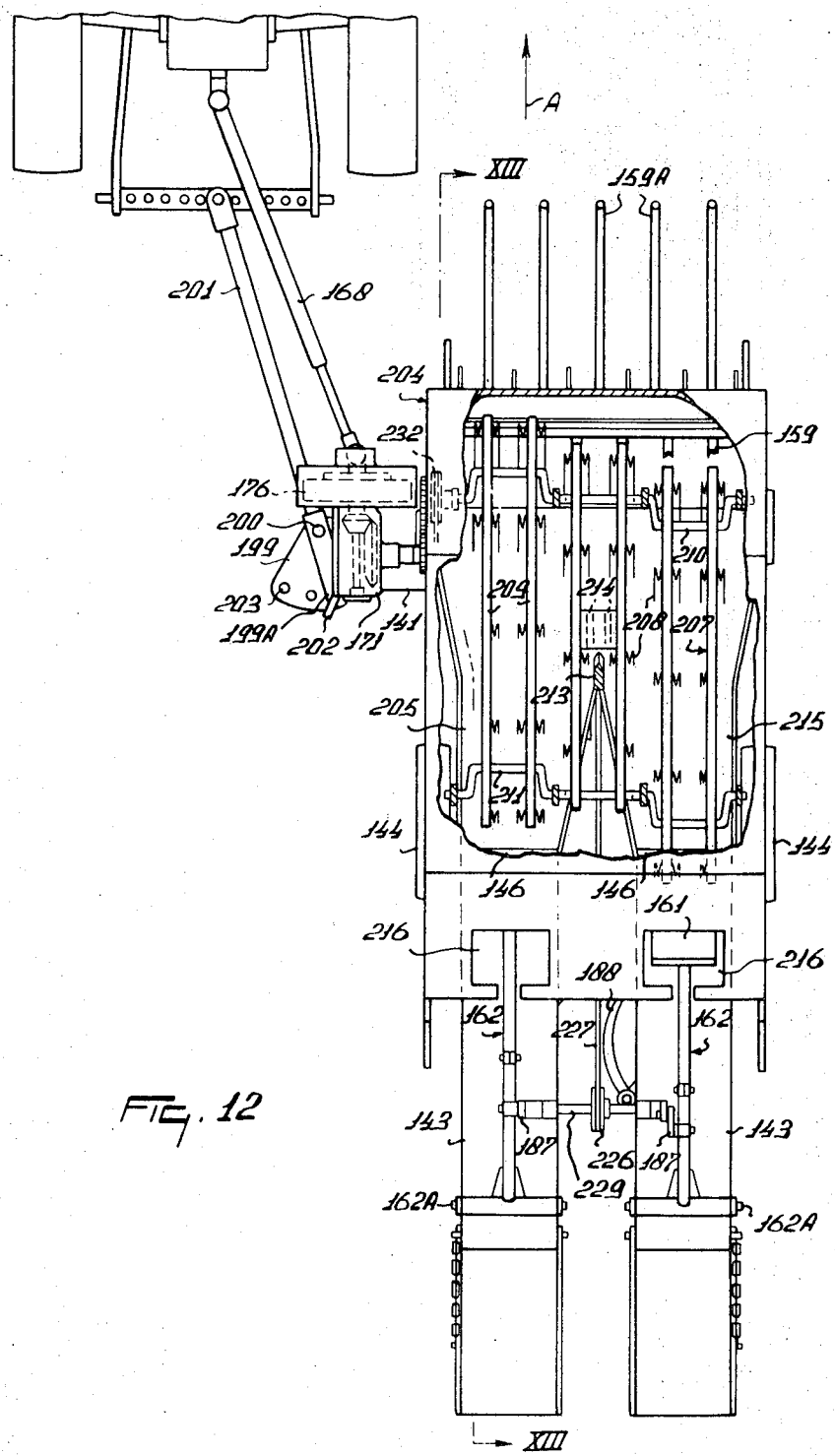

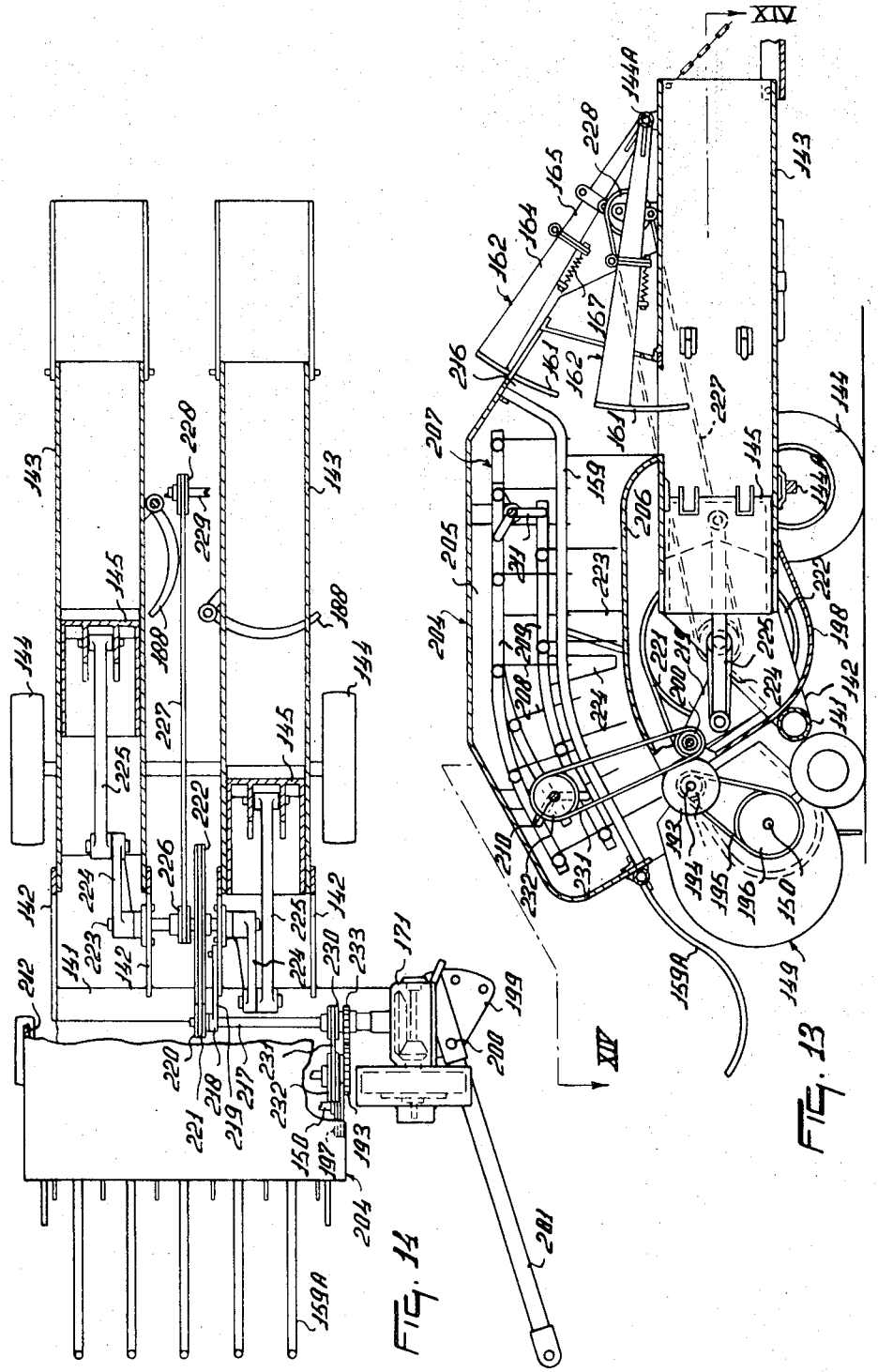

United States Patent Office 3,564,828
Patented Feb. 23, 1971

3,564,828
TRANSPORTABLE PRESSING MACHINE FOR COMPRESSING CROP
Cornelis van der Lely, 7 Bruschenrain, Zug, Switzerland
Filed Oct. 1, 1968, Ser. No. 764,074
Claims priority, application Netherlands, Oct. 5, 1967, 6713534; Mar. 7, 1968, 6803207
Int. Cl. A01f 15/04
U.S. Cl. 56—343       25 Claims

ABSTRACT OF THE DISCLOSURE

An agricultural machine with a crop pick-up and feeding members for moving picked up crop to one of several side-by-side pressing channels. The crop enters the channels at one end thereof and reciprocating plungers and knives are moved to compress and cut the crop. The plungers are off-set relative to one another. The feeding members, knives and plungers can be driven by a power take-off.

According to one aspect of the present invention there is provided a transportable pressing machine for compressing crop comprising a pick-up device for picking-up crop lying on the ground and two press channels for compressing the crop, there being a dividing member to the rear of the pick-up device with respect to the direction of movement of crop through the baler for splitting up the lifted swath in the longitudinal direction into two portions to be compressed one in each of said two press channels.

According to another aspect of the present invention there is provided a transportable pressing machine for compressing corp comprising a pick-up device and a press channel for compressing the crop, wherein at the front the press channel has a downwardly bent-over portion in which a press member is adapted to reciprocate.

The invention relates further to a transportable pressing machine for compressing crop pick-up device for crop lying on the ground and at least one press channel for compressing the crop.

In accordance with the invention the press channel is located, viewed in the direction of movement, behind the pick-up device and, viewed from aside, at least approximately at the same level with the pick-up.

In this way a low construction can be obtained so that in operation the machine travels with great stability.

For a better understanding of the invention and to show how the same may be carried into effect, reference will now be made by way of example to the accompanying drawings, in which:

FIG. 1 is a side view of a first form of transportable pressing machine in form of a baler, FIG. 2 is a plan view of the baler of FIG. 1, shown attached to a towing vehicle.

Figure 4:
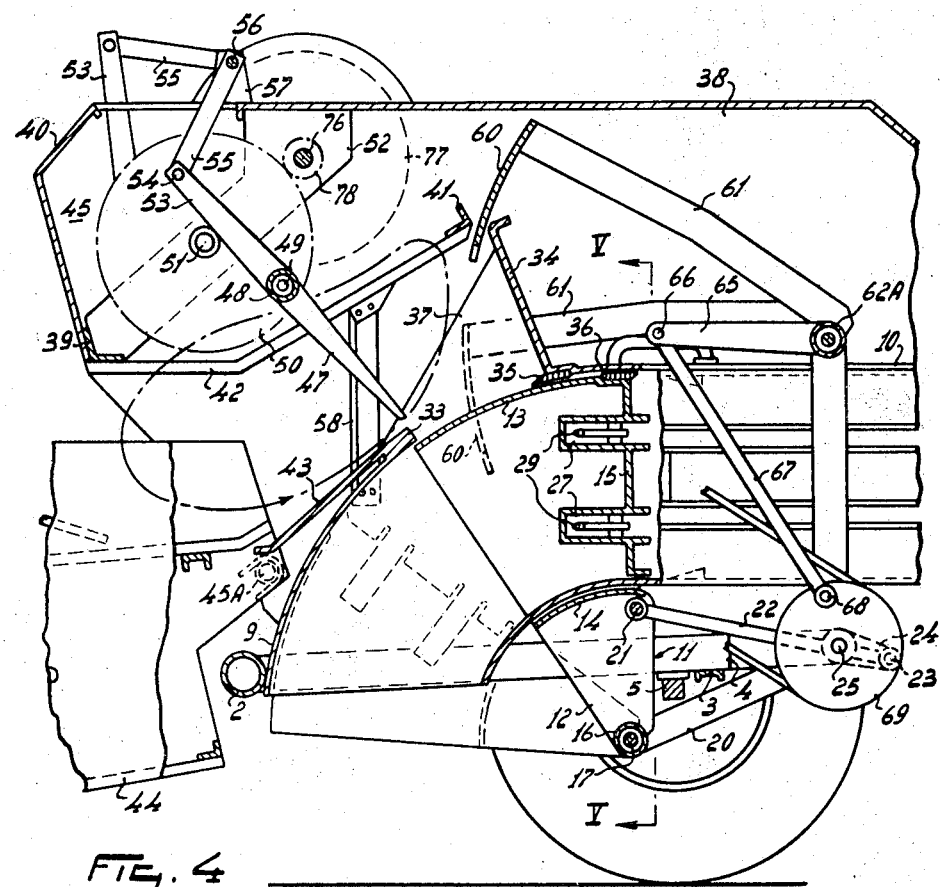
Figure 5:
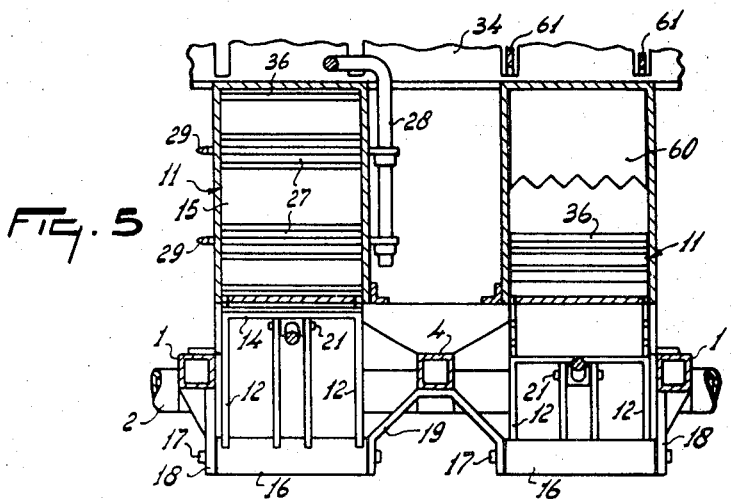
Figure 7:
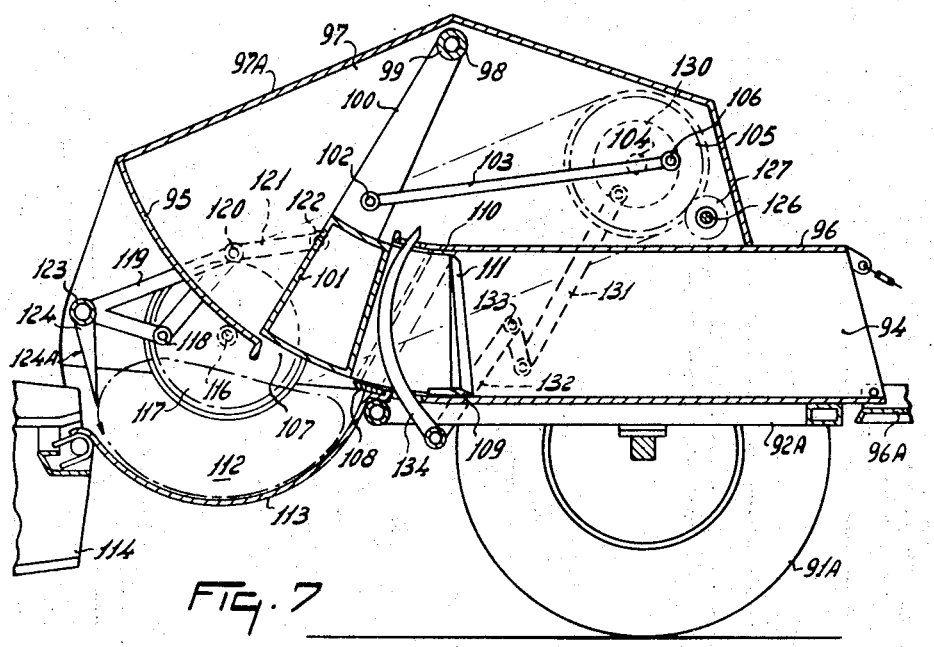
Figure 6:
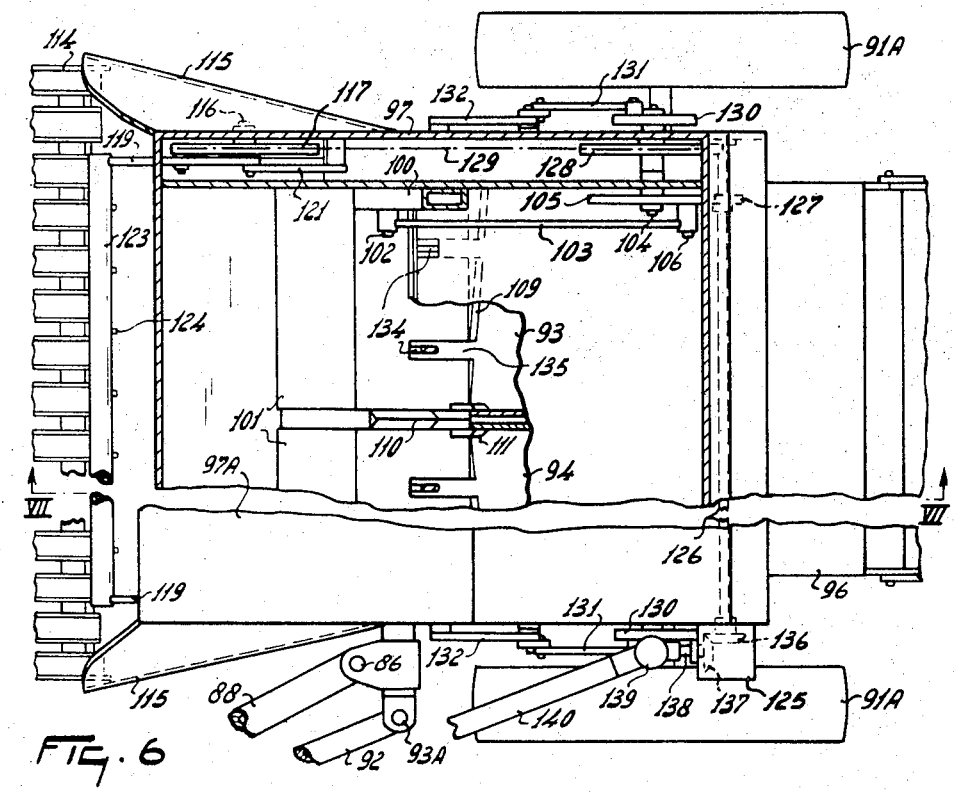

FIG. 3 is a plan view of part of the baler of FIGS. 1 and 2, an upper cover plate being omitted, FIG. 4 is a sectional side view of part of the baler of FIGS. 1 to 3, taken on the line IV—IV of FIG. 2, FIG. 5 is a sectional end view of part of the baler of FIGS. 1 to 4, taken on the line V—V of FIG. 4, FIG. 6 is a plan view, partly in section, of part of a second form of transportable baler, and FIG. 7 is a sectional side view of the baler of FIG. 6, taken on the line VII—VII of FIG. 6, FIG. 8 is a side elevation of an embodiment of a pressing machine according to the invention in form of a baler, FIG. 9 is a side elevation in the direction of the arrow IX in FIG. 8, the feeding mechanism being omitted, FIG. 10 is a sectional view taken on the line X—X in FIG. 9, FIG. 11 is a plan view of the feeder members arranged in the feeder space, FIG. 12 is a plan view of a further pressing machine in form of a baler embodying the invention, the upper side of the feeder space being omitted at least partly, FIG. 13 is a sectional view taken on the line XIII—XIII in FIG. 12, and FIG. 14 is a sectional view taken on the line XIV—XIV in FIG. 13.

The transportable pressing machine in form of a baler shown in FIGS. 1 to 5 has a frame that includes two parallel frame beams 1 extending in the intended direction of operative travel and interconnected at the front by a frame beam 2 and at the rear by a frame beam 3. The frame beams 2 and 3 are interconnected by means of a beam 4 located centrally between the frame beams 1.

From FIG. 4 it will be apparent that the front end of one beam 1 is located at a slightly lower level than the rear end thereof. Likewise the front ends of the frame beam 4 and the other beam 1 (which beams are not shown in FIG. 4) are located at a slightly lower level than the rear ends thereof, and hence the frame beam 2 is lower than the frame beam 3. Near the rear ends of the frame beams 1 and 4, and hence near the frame beam 3, an axle 5 extends transversely of the intended direction of operative travel and is provided at its ends with ground wheels 6 supporting the frame.

The frame carries two spaced-apart press channels 7 and 8 extending longitudinally of the baler. Each of the press channels 7 and 8 has a portion 9 (FIG. 4) at the front which is bent over in downward direction through a circumferential angle of about 90°. From the front of each channel 7, 8 the portion 9 thereof joins a rearwardly extending, horizontal portion 10 (see FIG. 4). In the curved portion 9 of each press channel 7 and 8 a press plunger 11 is mounted for reciprocation. Each press plunger 11 comprises parallel, sector-shaped plates 12 interconnected by connecting pieces 13, 14 and 15. The plates 12 pass through slots in the lower wall of the press channel which slots are located near the sidewalls of the press channel. From FIG. 4 it will be seen that the upper edge of each of the plates 12 is the widest edge. These upper edges of the plates 12 of each plunger 11 have a shape corresponding with that of the curved portion 9 and are connected by the connecting piece 13 of the plunger. Beneath the lower wall of the press channel the connecting piece 14 of the plunger connects the plates 12. The pieces 13 and 14 each have a shape which corresponds with the shape of the curved portion 9 of the press channel 7 or 8. The connecting piece 15 of each plunger 11 interconnects the side plates 12 thereof along the edges of the plates 12 facing the portion 10 of the associated press channel. The plates 12 of each press plunger 11 are adapted to pivot by means of a bearing 16 about a shaft 17. Each pivotal shaft 17 is fastened by means of support 18 and 19 respectively to the lower sides of the frame beams 1 and 4 respectively and extends parallel to the axle 5 (see FIG. 5). The supports 18 and 19 are held by means of beams 20 extending obliquely to the rear.

The figures show that the pivotal shafts 17 are in line with each other, while each shaft 17 is located substantially perpendicularly beneath the transition between the portions 9 and 10 of one or other of the press channel 7 and 8. Near the connecting piece 14 the plates 12 are pivoted by means of a pin 21 to a connecting rod 22, the other end of which is pivoted by means of a pin 23 to an arm 24 of a crank mechanism. The arm 24 is arranged on a shaft 25 extending parallel to the associated shaft 17 and journalled in a bearing 26 carried by the rear end of one or other of the frame beams 1. The arms 24 of the crank mechanisms for the respective press plungers are 180° out of phase with respect to each other so that, when one plunger 11 is in lowermost position the other plunger 11 occupies its topmost position. The connecting piece 15 of each press plunger 11 facing the associated press channel portion 10 is provided with parallel slot-shaped recesses 27 lying one above the other. These recesses accommodate movable needles 29 of a knotter (not shown) provided on the side of each press channel, which needles are pivotable each about a vertical shaft 28.

Near its rear end each press channel 7, 8 has at its upper and lower wall a mechanism 30 of known structure for adjusting the density of the bales to be made in the press channel. At the rear end of each press channel 7 and 8 the lower wall has pivoted to it a flap 31, the position of which can be varied by means of a chain 32. The upper wall of each press channel 7, 8 is provided near the transition between the curved portion 9 and the portion 10 with an inlet opening 33, which extends throughout the width of the press channel. The rear edge of each inlet opening 33 joins an upwardly extending plate 34 which is slightly inclined to the front and is bent over rearwardly at right angles at its upper end. The rear edge of each inlet opening 33 is provided with a downwardly extending knife 35 which is adapted to co-operate with a knife 36 arranged on the upper front (with respect to the working stroke) edge of the associated press plunger 11. Between the press channels 7 and 8 a roof-shaped guide 37 having a triangular shape viewed from the side is arranged at the level of the inlet openings 33. The lower edge of the roof-shaped guide 37 joins throughout its length the proximal edges of the respective inlet openings 33. The higher rear edge of the guide 37 joins the upwardly extending plate 34.

On the frame beams 1, extending in the intended direction of operative travel, upright plates 38 are arranged, the lower edges of which join the side-walls of the press channels 7 and 8, as will be seen from FIG. 1. Viewed from one side the plates 38 each have the shape shown in this figure. At the front of the plates 38 an angle-section iron 39 is arranged at the level of the upper walls of the press channels 7, 8 between the plates 38. To the angle-section iron is secured a cover plate 40 extending between the plates 38 first upwardly and forwardly, then upwardly and rearwardly and horizontally. An angle-section iron 41, extending parallel to the angle-section iron 39 is arranged between the plates 38 near the bent-over upper end of the plate 34. Between the angle-section irons 39 and 41 spaced, parallel strips 42 extend in the intended direction of operative travel as viewed in plan, the strips 42 extending from the angle-section iron 41 each through a straight portion extending obliquely downwards and forwards to terminate each in a straight horizontal portion which is secured to the angle-section iron 39. The front edges of the inlet openings 33 are joined by a downwardly projecting plate 43 disposed between the plates 38. The plate 43 joins at the front the upper part of a known pick-up device 44 which is pivoted to the machine frame by means of a shaft 45A extending transversely of the intended direction of operative travel.

The strips 42 and the plates 34 and 43 enclose a supply space, which joins at the front the pick-up device 44 and leads at the rear to the inlet openings 33 in the upper walls of the press channels 7 and 8. The supply space accommodates a feeder member 45 formed in two portions 46, which are located each at least partly in one or other of the respective halves of the supply space, each in front of the inlet opening 33 of one or other of the press channels 7, 8 (see FIG. 3). Each portion 46 of the feeder member 45 includes a support 48 provided with tines 47 extending downwardly from the support 48. The support 48 is pivotally arranged on a shaft 49 located above the strips 42 and arranged eccentrically between two gear wheels 50. The gear wheels 50 are arranged on supports 52 by means of horizontal, aligned stub shafts 51 extending transversely of the intended direction of operative travel. The tines 47 extend between the strips 42 into the supply space. A pair of arms 53 extending obliquely from near the center of each support 48 is pivoted, at the upper ends of the arms and with the aid of a pin 54, to an arm 55. The arm 55, which extends through an opening in the plate 40, is pivoted with the aid of a pin 56 to supports 57 on the plate 40.

It will be apparent from FIG. 3 that the supports 48 are 180° out of phase with respect to one another. The ends of the tines 47 on each of the supports 48 trace a kidney-shaped path in the supply space during the rotation of the supports, this path being shown in chain-dot lines in FIG. 4.

In front of the guide 37 and between the press channels 7, 8 a dividing member is arranged which is formed by a cutting mechanism. The cutting mechanism comprises two vertical knives 58 located one on each side of the center near the guide 37. The knives 58 are each secured at their upper ends to one or other of the strips 42 and at their lower ends to the plate 43. Each of the portions 46 of the feeder member 45 is adapted to co-operate with the cutting mechanism on the side facing the other portion 46 for dividing the collected swath in the longitudinal direction. For this purpose the support 48 of each portion 46 of the feeder member is provided with two spaced, angle-section elements 59 which are adapted to move in operation along each side of an associated one of the knives 58 and which are arranged as is shown for a pair of elements 59 in FIG. 3.

Between the bent-over upper end of each plate 34 and the angle-section iron 41 is arranged in front thereof a ram 60 is provided for each inlet opening 33. Each ram 60 is formed by a curved plate having a serrated lower edge. The upper edge of the ram 60 is secured to two spaced arms 61 arranged on a sleeve 62 which is pivotable about a shaft 64 (FIG. 3) carried above the press channel 7 or 8 by supports 63. Two spaced, forwardly projecting arms 65 are arranged on a sleeve 62A located at one end of each of the sleeves 62 on the shafts 64. Each pair of arms 65 is pivoted with the aid of a pin 66 to a connecting rod 67 which is pivoted by means of an eccentric pin 68 to a driven element 69 on the shaft 25 (FIG. 4).

As will be seen from FIG. 4, the connection between each rod 67 and the associated driven element 69, and the connection between the connecting rod 22 for each press plunger 11 and the arm 24 on the shaft 25 are such that, viewed along the longitudinal axis of either of the shafts 25, the circumferential angle between the pins 23 and 68 associated with the shaft is about 120°. In this way collision of the ram and the plunger in the press channel is avoided. The connecting pins 68 for the connecting rods 67 on the two rams 60 are 180° out of phase with respect to each other.

For driving the various described parts of the baler, the baler has on one side a gear box 71 fixed by means of supports 70 and accommodating a shaft 72 extending transversely of the intended operative travelling direction of the baler. The shaft 72, which projects from the gear box 71 towards the interior of the baler, is provided with a pulley 73 which is linked by a multiple belt 74 to a pulley 75 which is constructed as a fly-wheel. The pulley 75 is arranged on one end of a shaft 76 journalled in the supports 52 and extending parallel to the stub shafts 51. The other end of the shaft 76 is provided with a fly-wheel 77. Each of the gear wheels 50 for one or other of the supports 48 of the portion 46 of the feeder member is in driving connection with an associated pinion 78 on the shaft 76. Each of the stub shafts 51, is provided with a chain sprocket 79 which is linked by a chain 80 to a chain sprocket 69. From the sprockets 69, via a driving gear (not shown) which may be constructed in a conventional manner, the needles 29 and the knotters (not shown) can be driven. The pick-up device can be driven from the driving shaft 76 in a way not shown.

The shaft 72 is provided inside the gear box with a bevel gear wheel 81 which is adapted to co-operate with a bevel gear wheel 82 on a shaft 83 which extends in the intended direction of operative travel of the baler and one end of which projects out of the gear box. This projecting end may be connected by a universal joint 84 (FIG. 2) with an auxiliary shaft 85. The auxiliary shaft 85 may be coupled by a universal joint with the power take-off shaft of a tractor propelling the baler. For coupling the baler with the tractor, the baler is provided with a drawbar 88 arranged by means of a vertical shaft 86 on a prolongation 87 of the frame beam 2. The drawbar 88 is provided at a distance from its pivotal connection with the prolongation 87 with a strip 89 having two holes 90. A pin 91 is adapted to co-operate with these holes for coupling a rod 92 to the drawbar 88, the rod 92 being pivoted, by means of a shaft 93A, to the prolongation 87. With the aid of the rod 92 and the holes 90 in the strip 89 the drawbar 88 can be moved into two positions which represent the working position and the transport position respectively of the baler. The baler described above operates as follows.

In operation the baler can be propelled by means of a tractor via the drawbar 88 in the direction of the arrow A. The various parts of the baler to be driven can be driven by the power take-off shaft of the tractor via the auxiliary shaft 85.

During such operation crop lying on the ground is lifted by means of the pick-up device 44 and carried into the supply space within the range of the tines 47 of the adjacent portions 46 of the feeder member 45, which portions are arranged in front of each press channel 7 and 8 respectively. The tine ends of the two portions trace their paths with a phase difference of 180°.

The tines 47 of the feeder member portions, the ends of which, as stated above, trace a kidney-shaped path in the supply space, engage the crop supplied by the pick-up device 44 and push it towards the inlet openings 33 of the press channels 7 and 8 respectively.

The swath thus supplied is divided into two portions by means of the co-operating elements 59 of each of the portions 46 of the feeder member and the cutting mechanism associated with the dividing member and comprising the knives 58, the portions of crop being conveyed via the roof-shaped guide 37 towards the inlet opening 33. The crop is then displaced by means of the reciprocating rams 60, which move up and down, through the inlet openings 33 into the press channels 7 and 8. The crop entering the press channels 7 and 8 is compressed therein by the plungers 11, which perform pivotal movements from below towards the rear of the baler. The material compressed in each press channel into a bundle or bale, the density of which can be regulated by means of the mechanism 30 on the rear of each press channel, is provided with wire or twine by means of the knotter and the associated needles and the bundle or the bale is delivered via the flaps 31 behind the baler onto the field.

In the construction described above the portion of the feeder member located in front of one press channel and the ram and the plunger associated with this press channel are always moving with a phase difference of 180° with respect to the corresponding members associated with the other press channel. This facilitates quiet travel.

The transportable baler described above permits processing material lying in a swath to form bales.

The second form of baler, shown in FIGS. 6 and 7, has a frame 92A supported from ground wheels 91A. The frame 92A is provided with two adjacent press channels 93 and 94 that extend in the intended direction of operative travel of the baler. Each press channel 93 and 94 has a portion 95 at the front, which is bent over in upward direction. From the front of each channel 93, 94, the portion 95 thereof merges with a rearwardly projecting portion 96 that terminates the channel. At the rear a flap 96A is provided in common for the press channels 93 and 94 for delivering the bales.

On either side the frame 92A is provided with vertical plates 97, joining the sidewalls of the press channels 93, 94 and shaped in the form shown in FIG. 7. Between the plates 97, near their upper edges, a shaft 98 extends transversely of the intended direction of operative travel of the baler. By means of bearings 99, pivotable arms 100 are arranged, spaced from each other, so as to pivot around the shaft 98. At the end remote from the shaft 98 each arm is provided with a press plunger 101 which is disposed to reciprocate in the curved portion 95 of one or the other of the press channels 93 and 94. Near its associated plunger 101 each arm 100 is pivoted by means of a pin 102 to a connecting rod 103, the other end of which is pivoted to a crank mechanism. The crank mechanism comprises a gear wheel 105 on a shaft 104, which wheel is coupled by means of a pin 106, disposed eccentrically to the axis of rotation of the gear wheel, with the connecting rod 103.

Near the transition between the portion 95 and the straight portion 96 of each press channel, the adjacent lower walls of the press channel are each provided with an uninterrupted inlet opening 107 in front of the two press channels. For each press channel the rear edge of the inlet opening 107 is provided with a knife 108 extending throughout the width of the press channel 93 or 94 respectively and adapted to co-operate with a knife 109 provided at the front (with respect to the working stroke) of the associated plunger 101. Each knife 109 extends, as can be seen from FIG. 6, from the outer side of its plunger obliquely inwardly. A vertical knife 110 is arranged between the press channels 93 and 94 so as to extend from the rear edge of the inlet opening 107 obliquely to the rear in upward direction. The knife 110 co-operates with a pair of vertical knives 111 arranged on the proximal sides of each of the plungers 101. The width of each knife 111 increases in downward direction (see FIG. 7).

The inlet opening 107 communicates with a supply space 112 extending over the width of the baler. The lower wall of the supply space 112 is formed by a curved plate 113 which extends from the rear of the inlet opening 107 up to a pick-up device 114 pivoted to the frame 92A of the baler. In order to ensure a satisfactory transition from the pick-up device 114 to the supply space 112, outwardly extending flaps 115 are provided at the sides of the baler so as to join the plate 113. The sides of the supply space 112 are formed by parts of the vertical plates 97, between the upper edges of which a plate 97A extends. A stub shaft 116, which is provided below the portion 95 of the press channels on each of the plates 97, is provided with a gear wheel 117. A pin 118 is secured to each of the gear wheels 117 near the periphery thereof. A triangle 119 having an obtuse apex is mounted on each pin 118 so as to be pivotable, the pin 118 being at the obtuse apex of the triangle 119. Each triangle 119 is also pivoted, by means of a pin 120, to an arm 121, which is pivoted by means of a pin 122 to the sidewall 97. A pipe 123, extending transversely of the intended direction of operative travel of the baler, is arranged between the foremost corners of the triangles 119, this pipe being provided at regular intervals with tines 124. The pipe 123 and the tines 124 form a feeder member 124A.

For driving purposes the baler is provided with a gear box 125, in which one end of a shaft 126, extending transversely of the intended direction of operative travel of the baler, is journalled. The shaft 126 is furthermore journalled in the plates 97. Gear wheels 127 are arranged on the shaft 126 and are adapted to co-operate each with one or other of the gear wheels 105 for driving the press plungers 101. Each of the shafts 104 (on which the gear wheels 105 are mounted) is furthermore provided with a gear wheel 128 which is connected, via a chain 129, with one or other of the gear wheels 117 for driving the feeder member 124A. Each of the shafts 104 is furthermore provided with a crank mechanism 130 which drives needles 134 associated with a knotter (not shown) and adapted to pivot about a horizontal shaft 133 via arms 131 and 132 pivotally connected with each other. Each press plunger 101 has in its face that faces the crop in operation recesses 135 for passing the needles.

One end of the shaft 126 is provided, within the gear box 125, with a bevel gear wheel 136 which co-operates with a bevel gear wheel 137 on a shaft 138 projecting from the gear box and adapted to be coupled via universal couplings 139 and an auxiliary shaft 140 with the power take-off of the tractor propelling the baler. The pick-up device 114 can also be driven from the shaft 126 in a manner not shown. By means of the drawbar 88 the baler can be coupled with a tractor in the same manner as in the baler described with reference to FIGS. 1 to 6.

In operation the baler of FIGS. 6 and 7 can be coupled with the tractor in the manner described for the baler of FIGS. 1 to 6 and the various elements can be driven from the power take-off shaft of the tractor. During the movement of the baler drawn by the tractor the crop swath can be picked up by means of the pick-up device 114 and be pushed into the reach of the tines 124 of the feeder member 124A, operative in the supply space 112. The tines 124 carry the crop into the inlet opening 107 on the lower sides of the press channels 93 and 94 and by means of the plunger 101 the crop is compressed in each channel. By the co-operation between the knives 111 of the plungers 101 and the knife 110 of the cutting mechanism associated with the dividing member the swath supplied through the opening 107 is divided in the longitudinal direction. After the compressed material has been bound with the aid of the needles 134 and the knotters (not shown), the bales are deposited on the ground via the flap 96A which is common to the two press channels.

The construction shown in FIGS. 8 to 11 is that of a movable baler comprising a frame having a frame beam 141, extending transversely of the direction of travel of the machine and having secured to it the front side of the compression channel 143, extending in the direction of movement, by means of parallel, rearwardly extending plates 142.

The frame is supported near the front from ground wheels 144, located on either side of the press channel and arranged on an axle 144A (see FIG. 9). The press channel 143 accommodates a ram 145, which is adapted to move, in operation, in the longitudinal direction of the press channel. Near the front the upper side of the press channel 143 has an inlet opening 146, which is located just in front of the center of the press channel, viewed in the direction of travel, as will be seen from FIG. 10. The inlet opening 146 communicates with a feeder space 147 which forms part of a feeder mechanism 148, which is arranged between the press channel 143 and a known, pivotally arranged pick-up 149, which comprises a drum 151, adapted to rotate about a shaft 150. The feeder space 147, as will be seen from FIG. 10, is located above the pick-up device 149 and the press channel 143. The lower side 147A of the feeder space 147 has a portion inclined upwards to the rear and terminating in an at least substantially horizontal portion, which joins the press channel 143. The feeder space 147 is bounded by vertical walls 152 and above by a plate 153. On the rear side a wall 154 joins the rear side of the inlet opening 146 of the press channel 143.

From FIGS. 9 and 11 it will be apparent that the feeder space 147, viewed from above, extends from the pick-up 149 to the inlet opening 146 of the press channel 143 in the form of a funnel. In the feeder space 147 feeder members 155 are arranged side by side at least substantially in the longitudinal direction of the baler. The feeder members 155 are formed by supports 157 of spring-steel tines 156, which supports are held near their front and rear ends by crank shafts 158 and 158A respectively, journalled in the walls 152. Viewed from aside the shape of the supports 157 corresponds with the shape of the lower side of the feeder space 147.

As will be seen from FIG. 11, the supports 157 are located more closely to each other at the front than at the rear of the feeder space 147. In operation the supports 157 with the spring-steel tines 156 move in relatively opposite directions for feeding on the crop picked up by the pick-up device 149. Beneath the supports 157 the feeder space 147 accommodates a screening 159, which has the shape shown in FIG. 10, through which the resilient tines 156 are moving in operation. At the front a guide 159A, extending above and as far as in front of the pick-up 149, joins the screening 159.

On the rear side the feeder space 147 has an opening 160 between the upper plate 153 and the wall 154 in which a feeder member is adapted to move in a direction of height. The feeder member comprises a plate-shaped ram 161, which is fastened to one end of an arm 162. The arm 162 is pivoted by a shaft 162A to the rear and the upper sides of the press channel 143. The arm 162 comprises a safety mechanism 163, which comprises a pivotal shaft 166, located between two portions 164 and 165 of the arm. By means of a spring mechanism 167 the parts are held in the desired position in operation. In this case it is the position in which the parts 164 and 165 are in line with each other.

For driving the various parts of the baler, which are movable in operation, it is provided with a driving shaft 168, extending transversely of the direction of movement and located beneath the feeder space 147, one end of said shaft protruding, viewed from above, from the feeder space 147. The shaft 168 is journalled by one end in a bearing 169 in a plate 142, whereas the other end is journalled in a bearing 170 on the beam 141. By means of a support 171A a gear box 171 is secured to one end of the beam 141. The gear box 171 accommodates a shaft 192, extending parallel to the shaft 172. The shaft 172 is provided inside the gear box 171 with a bevel gear wheel 173, which is adapted to co-operate with a bevel gear wheel 174 on a shaft 175, extending in the direction of movement and journalled in the gear box 171. Outside the gear box 171 with a fly-wheel 176 having a slip coupling. The shaft 175 is linked by a universal coupling 179 to an auxiliary shaft 178, which can be coupled with the power take-off shaft of a tractor moving the baler. The shaft 172 is provided with a chain sprocket 177, which is linked by a chain 180 to a chain sprocket 180A on the shaft 168. Between the plates 142 the shaft 168 is provided with a crank mechanism 181, which is connected with a connecting rod 172, which is pivotally coupled with the rear side of a ram 145. The shaft 168 is furthermore provided with a chain sprocket 183, which is linked by a chain 184 to a chain sprocket 185 on a shaft 186, which is arranged on the upper side of the press channel 143 and which is provided with a crank mechanism 187 which is pivoted to the arm 162, which supports the ram 161.

The driver of a knotter mechanism comprising needles 188, adapted to turn about a vertical shaft, is not shown in detail, but it may be performed in known manner through the drive of the ram 145 and the ram 161.

The shaft 172 is provided with a chain sprocket 189, which is linked through a chain 190 to a chain sprocket 191 on the foremost crank shaft 158 for the supports 159. The shaft 172 furthermore has a gear wheel 192, which is adapted to co-operate with a gear wheel 193 on a shaft 194, which forms at the same time the pivotal shaft about which, in operation, the pick-up member 149 is adapted to turn in upward direction. The shaft 194 has a pulley 195, which is linked by a rope 196 to a pulley 197 on the shaft 150 of the drum 151 of the pick-up device 149. The space accommodating the driving gear for the baler is covered on the lower side by a curved plate 198. On the side of the beam 141 with the gear box 171 two horizontal plates 199 are secured to the end of the beam so as to lie one above the other. The plates 199 are located between the prongs of a fork 199A, which forms part of a drawbar 201 and is pivoted by means of a shaft 200 to the plates 199. The drawbar 201 can be fixed in various positions by means of a pin 202, which can be passed through holes 203 in the plates 199 and a hole in the fork 199A for moving the baler into the transport position or the working position.

The operation of the implement described above is as follows:

In operation the implement can be moved by a tractor in the direction of the arrow A of FIG. 8, while the various movable parts are driven by means of the drive described above from the power take-off shaft. Crop lying on the ground can be picked up by means of the tined drum 151 of the pick-up device 149 and be moved into the reach of the feeder members 155, provided with spring-steel tines 156 and arranged inside the feeder space 147. With the aid of these feeder members the crop is displayed to the rear until it arrives into the range of the ram 161, which conveys it through the inlet opening 146 into the press channel 143. The ram 145, performing a reciprocatory movement in operation, compacts the crop in said channel in known manner to form bales, which are bound by means of the knotter and conducted out of the rear side of the press channel. The movement of the ram 161 is such that it withdraws from the opening 146 when the pressing carriage 145 moves to the rear for the compacting stroke.

In the construction described above, as will be seen from FIG. 10, the press channel is located, viewed in the direction of travel, behind the pick-up device 149 and at least substantially level herewith. The lower side of the press channel 143 is located at least approximately at the same level as the rotary shaft 150 of the drum 151 of the pick-up device 149, so that a low, compact construction is obtained. By means of the safety mechanism 163 the ram 161 is capable of deflecting about the shaft 166 in upward direction. In this manner damage of the assembly can be avoided.

FIGS. 12 to 14 show an embodiment of a movable baler which is mainly of the same structure as the baler in the first embodiment. Corresponding parts are therefore designated by the same reference numerals.

The baler shown in FIGS. 12 to 14 is, however, provided with two spaced press channels, extending in the direction of travel and corresponding each with the press channel 143 of the first embodiment and arranged in the same manner relatively to the pick-up device 149. Between the front sides of the press channels 143 and the pick-up device 149 a feeder mechanism 204 is provided in this embodiment, said mechanism comprising a feeder space 205, which like the feeder space 147 of the first embodiment, is located, viewed from aside, above the pick-up device 149 and the press channels 143. The lower side of the feeder space 204 has the same shape as the lower side of the feeder space 147 of the first embodiment. In this embodiment, however, as will be seen from FIG. 12, the feeder space is mainly rectangular viewed from above. The feeder space 205 of this embodiment comprises three pairs of feeder members 207, extending in the direction of length of the baler and formed each by a support 209, provided with resilient tines 208. Each support 209 is arranged near the front and rear sides on crank shafts 210 and 211, which are journalled in the vertical walls 212 of the feeder space 204. Near the center of the feeder space a vertical knife 213 is provided, which is adapted to co-operate with a vertical element 214, arranged between the feeder members 207 of the pair located near the center of the feeder space. From the knife 213 the feeder space 204 is divided into two feeders 215, leading to the inlet openings 146 on the upper side of each press channel 143.

As in the first embodiment a ram is provided for each press channel, said ram moving in this embodiment in an opening 216 on the rear side of the respective feeders 215.

For driving the movable parts of this embodiment in operation a driving shaft is provided beneath the feeder space 204 so as to extend transversely of the direction of travel. The driving shaft 217 is journalled at one end in a bearing 218, which is fastened by a support 219 to a plate 142. At the other end the driving shaft is journalled in the gear box 171. The end of the driving shaft 217 remote from the gear box 171 is provided with a chain sprocket 220, which is linked by a chain 221 to a chain sprocket 222 on a shaft 223, journalled in the plates 142 between the press channels 143 and extending transversely of the direction of movement. The shaft 223 is provided between the plates 142 with crank mechanisms 224, which are connected by means of a connecting rod 225 with the pressing carriage 145.

As will be apparent from FIG. 14 the crank mechanisms 224 are relatively arranged so that the respective rams 145 are moving in opposite directions in operation. The shaft 223 has furthermore a sprocket 226, which is linked by a chain 227 to a sprocket 228 on a shaft 229, extending transversely of the direction of travel and provided at its ends with crank mechanisms 186 for driving the arms 162 of the rams. On the side of the gear box 171 the driving shaft 217 is provided with a sprocket 230, which is linked by a chain 231 to a sprocket on the foremost crank shaft 210 of the feeder members 207. The shaft 217 is furthermore provided with a gear wheel 223, which is adapted to cooperate with the drive for the pick-up member 149, which is completely similar with the pick-up device 149 of the first embodiment. The drive of the knotter associated with each press channel and provided, like in the first embodiment, with needles 188, adapted to turn about vertical shafts, can be obtained in known manner (not shown) from the drive of the ram.

The implement in the fourth embodiment operates as follows:

In operation crop lying on the ground can be lifted by the pick-up device 149 and be moved into the range of the tines 208 of the feeder members 207 located inside the feeder space 204. The crop is divided into two portions during its rearward displacement by means of the vertical knife 213, which forms a separation member for dividing the flow of crop supplied in the longitudinal direction, each portion being pushed from the knife by the feeder members into the feeders 215 leading to the inlet openings 146 in each of the press channels 143. At the end of the feeders 215 the supplied crop is pushed by the rams into the press channels 143, which it can be compressed in known manner into bales which, after having been bound, are delivered from the rear sides of the press channels.

As in the preceding one the press channels in this embodiment are located, viewed in the direction of movement, behind the pick-up device 149 and at least approximately at the same level as the pick-up device, while the lower sides of the press channels 143 are level with the axis 150 of the drum 151 of the pick-up.

In the last embodiment the baler is capable of working a larger quantity of crop per unit time so that the efficiency can be considerably raised. Also in this embodiment, like in the first, a low compact structure of the baler is obtained, so that it travels with great stability in operation.

It will be obvious that the constructions described above may also be employed for compacting the crop into smaller units, for example, cakes. Thereby it is not necessary to use ropes or the like to hold the crop in bales. It will be clear that the crop can be held together also by other means.

Also there can be used more than two press channels, e.g. three or four.

What I claim is:

1. A transportable agricultural machine for processing crop having a frame, said frame supporting a pick-up device for crop lying on the ground and two press channels to the rear of said pick-up device for compressing crop received from said pick-up device, a dividing member located between said pick-up device and said press channels for dividing the pick-up crop into two portions whereby each portion is compressed separately in a press channel.

2. A machine as claimed in claim 1, wherein said press channels are located side by side as viewed from above and are elongated in configuration so that their longitudinal center lines extend straight in the direction of travel of said machine.

3. A machine as claimed in claim 2, wherein a feeder member for feeding the crop to said press channels is located between said pick-up device and said press channels.

4. A machine as claimed in claim 3, wherein said feeder member is a support with tines and said support moves responsive to crank means positioned on either side of said support, said crank means being connected to said support and including a gear wheel, said support being connected eccentrically with respect to the axis of rotation of said gear wheel by means of a triangular support with said crank means.

5. A machine as claimed in claim 3, wherein the ends of said tines move in a supply space located between said pick-up device and said press channels.

6. A machine as claimed in claim 5, wherein said feeder member comprises two adjacent portions for feeding crop to respective press channels and to form two supports with tines each comprising a portion of a separate feeder member, one support with tines being disposed about 180° out of phase relative to the other.

7. A machine as claimed in claim 1, wherein said dividing member comprises a cutting mechanism, said cutting mechanism being located between said press channels in front of the mouths of said press channels.

8. A machine as claimed in claim 7, wherein said cutting mechanism includes a knife, said knife being located substantially centrally between said press channels.

9. A machine as claimed in claim 8, wherein said knife extends substantially vertically and obliquely upwards and rearwards.

10. A machine as claimed in claim 8, wherein said cutting mechanism is operatively associated with a feed member located between said pick-up device and said channels.

11. A machine as claimed in claim 10, wherein a press member is mounted to reciprocate in each press channel and said cutting mechanism is located forwardly of said press members.

12. A machine as claimed in claim 10, wherein said feeder member includes an element which moves to cooperate with said knife for splitting up the picked-up crop into several portions.

13. A machine as claimed in claim 10, wherein each portion of said feeder member is provided at its end facing the other portion, with a cutting element adapted to cooperate with the knife of said cutting mechanism.

14. A machine as claimed in claim 13, wherein said feeder member includes a further cutting element, and the two cutting elements are spaced from one another to be arranged to pass on either side along said knife during the operative movement of said feeder member.

15. A machine as claimed in claim 8, wherein said press channels have an inlet opening and a guide is positioned downstream from said cutting mechanism for moving the crop towards the inlet opening of each press channel.

16. A machine as claimed in claim 15, wherein an inlet opening is provided in the lower wall of each press channel.

17. A machine as claimed in claim 15, wherein there is a feeder member for each press channel and each feeder member includes a ram which reciprocates in said press channels and pivots about a substantially horizontal shaft.

18. A machine as claimed in claim 8, wherein a press plunger is mounted to reciprocate in each press channel.

19. A machine as claimed in claim 18, wherein the press plunger for each press channel has a knife which cooperates with said cutting mechanism.

20. A machine as claimed in claim 18, wherein each press plunger is mounted to move in a bent-over portion of its associated press channel, the bent-over portion of each press channel extending in a downward direction.

21. A machine as claimed in claim 1, wherein a feeder mechanism is located between said pick-up device and said channels in a feeder space having a lower side inclined inwardly from said pick-up device and terminating in an at least substantially horizontal portion joining said press channels.

22. A machine as claimed in claim 21, wherein said feeder space houses a plurality of feeder members mounted side by side to extend in the longitudinal direction of said space, said feeder members being mounted on supports with tines and said supports being connected to cranks, said supports having a configuration which corresponds generally with the shape of the lower side of said feeder space.

23. A machine as claimed in claim 21, wherein the rear end of said feeder space has a first opening which communicates with a further opening in the upper side of said press channels, said feeder space extending as a funnel from the front towards said first opening and said feeder members being closer to one another on the rear side of said feeder space than at the front of said feeder space.

24. A machine as claimed in claim 1, wherein a press plunger is mounted to reciprocate in each channel, the drive for said plungers being located between said press channels and connected to move said press plungers in opposite directions.

25. A transportable agricultural machine for processing crop having a frame, said frame supporting a pick-up device for crop lying on the ground and two press channels to the rear of said pick-up device for compressing crop received from said pick-up device, a dividing member located between said pick-up device and said press channels for dividing the picked-up crop into two portions, each portion to be compressed individually in said press channels, an opening in each press channel and a pair of rams with offset movements for forcing crop into said openings, a pair of plungers with offset reciprocal movements in said channels, a source of power for driving said pick-up device, said rams and said plungers, said source of power comprising a power take-off.

References Cited

UNITED STATES PATENTS

| | | | |
|---|---|---|---|
| 267,148 | 11/1882 | Cady et al. | 100—209X |
| 652,115 | 6/1900 | James | 100—209 |
| 3,134,321 | 5/1964 | Loehnert | 100—98 |
| 3,153,890 | 10/1964 | Harrington | 56—341 |

RUSSELL R. KINSEY, Primary Examiner

U.S. Cl. X.R.

100—209